Aug. 13, 1929.  G. W. CARLSON  1,724,452
AUTOMOTIVE BRAKE
Filed Feb. 11, 1925
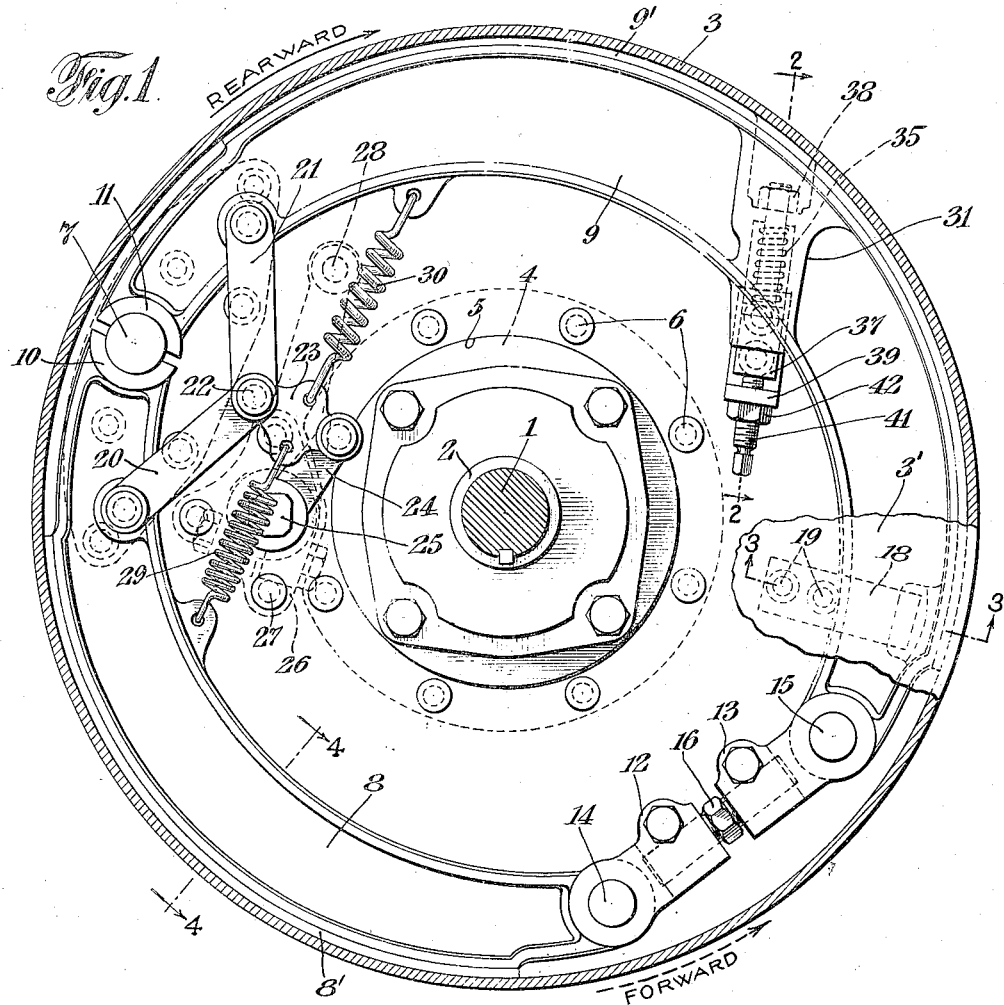
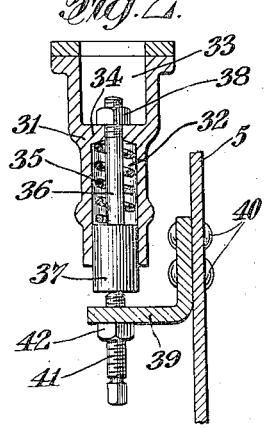
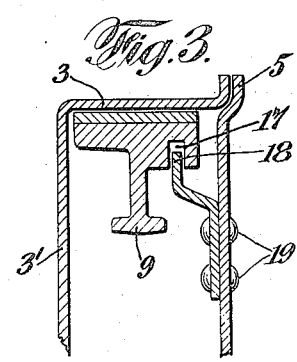
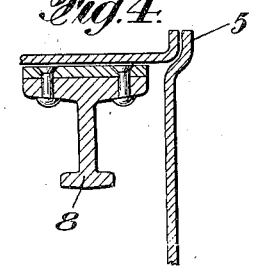
Inventor
Gustav W. Carlson
By his Attorneys Ward Crosby & Smith Patented Aug. 13, 1929.

1,724,452

UNITED STATES PATENT OFFICE.

GUSTAV W. CARLSON, OF CLEVELAND, OHIO, ASSIGNOR TO THE EATON AXLE & SPRING COMPANY, OF CLEVELAND, OHIO, A CORPORATION OF OHIO.

AUTOMOTIVE BRAKE.

Application filed February 11, 1925. Serial No. 8,338.

My invention relates to brakes and more particularly to internal expanding brakes of the so called self energizing type such as are adapted for use on automotive vehicles.

Heretofore in this type of brake it has been found that the brake is not nearly as efficient when the member to be braked is rotating in a rearward direction. That is, the self energizing action which takes place in forward rotation is greatly lacking in rearward rotation of the brake drum.

The chief object of this invention is to provide a brake which will give a substantially equal self energizing action upon rearward or forward rotation of the brake drum.

The invention consists in the novel features arrangements and combination of parts embodied in the apparatus hereinafter described as illustrating the preferred form of the invention, and the invention will be more particularly pointed out in the appended claims.

Further objects and advantages of the invention will more fully appear from the following description taken in connection with the accompanying drawings which show, by way of example, the preferred embodiment of the invention.

Referring to the drawings:—

Fig. 1 illustrates the brake and parts associated directly therewith, partly in section.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Referring to Fig. 1, 1 represents the axle to which the brake is to be applied; in this embodiment the rear axle of an automotive vehicle. A hub 2 is keyed to the axle 1 and is adapted to carry the vehicle wheel (not shown), to which is attached the brake drum 3, so that as the axle 1 rotates the hub rotates, together with the wheel and the brake drum 3. A non-rotatable part such as the axle housing 4 carries a dust shield 5 fastened thereto as by rivets 6. The dust shield 5 is provided with a projecting pin 7 which extends toward the head 3' (Fig. 3) of the brake drum 3. The pin 7 provides bearing portions against which the brake shoes abut, for purposes next to be explained, and may be termed an anchor pin.

The relatively rigid brake shoes 8 and 9 are provided respectively with concave free ends 10 and 11 adapted to bear against the bearing portions of the pin 7. At their other ends the shoes 8 and 9 are respectively pivotally connected to shackle ends 12 and 13 by means of the pins 14 and 15. The shackle ends 12 and 13 are provided respectively with left and right hand female threads in cooperative engagement with a turnbuckle bolt 16, thus providing an adjustable pivotal connection between these adjacent ends of the brake shoes 8 and 9. The pivots 14 and 15 together with the connecting turnbuckle members 12, 13 and 16 form in effect a double pivotal connection which allows greater freedom of movement of the shoes 8 and 9. The shoes 8 and 9 thus connected may be considered as a single expansible brake means which is adjustable lengthwise to thereby vary its peripheral length. Replaceable friction elements 8' and 9' are preferably attached, respectively, to the shoes 8 and 9, as is well understood in the art.

The shoe 9 is provided with a slot 17, adjacent the pivoted end thereof, (Fig. 3) into which extends the free end of a guide clip 18 fastened to the dust shield 5 as by rivets 19. This arrangement holds the brake shoes against axial movement with respect to the drum 3.

A toggle link 20 is pivotally connected at one end to the shoe 8 adjacent the end 10; and a toggle link 21 is pivotally connected at one end to the shoe 9 adjacent the end 11. The opposite ends of the toggle links 20 and 21 are pivotally connected by means of a pin 22, which carries a link plate 23. This link 23 is pivoted at its other end to an arm 24 keyed or otherwise secured upon a stub shaft 25, supported in a bearing plate 26 attached to the dust shield 5 by rivets 27, and free to rotate in said bearing. On the opposite side of the shield 5 an actuating arm 28 is secured to the other end of the shaft 25, which projects beyond the outside of the dust shield 5. This arm 28 is adapted to be connected to suitable control elements convenient to the operator. It will therefore be seen that by means of the links 20 and 21 and link plate 23 which is pivoted to the outer end of the arm 24 and by means of the pins 14 and 15, the brake segments 8 and 9 are supported in a "fully floating" condition, the significance of which will be more fully explained following under "Operation."

A tension coil spring 29 is connected at one end to the link plate 23 and at the other end to shoe 8 at a point adjacent the toggle link 20, and serves to hold the end 10 of the shoe 8 toward the pin 7 and normally bearing against a portion of the pin 7. Similarly a second tension coil spring 30, less resilient than the spring 29, is connected to the link plate 23 and the shoe 9 and serves to hold the end 11 of the shoe 9 toward the pin 7 in a similar manner.

The brake shoe 9 is provided with a boss 31 at a point intermediate its two ends. This boss (Fig. 2) is provided with a central bore 32, and a connecting central bore 33, with a shoulder 34 between these bores. A compression coil spring 35, less resilient than the spring 30, is seated in the bore 32 with one end bearing against one side of the shoulder 34. A plunger pin 36, provided with a cylindrical head portion 37 adapted to slide within the bore 32, passes axially through the spring 35 and past the shoulder 34, and is threaded to engage a nut 38; thereby providing for the adjustment of the spring between the shoulder 34 and the head 37. An extension bracket 39 is secured to the dust shield 5 by the rivets 40, and carries a set screw 41 in threaded engagement therewith and adapted to act as a stop for the head 37 of the bolt 36. A lock nut 42 is adapted to lock the set screw 41 in the desired position.

It will be seen from the foregoing that the brake shoes are resiliently supported by the three springs 29, 30 and 35 which cooperatively normally hold the shoes in abutting engagement with the anchor pin 7 and properly positioned in non-breaking engagement with respect to the drum 3. The spring 35 being the least resilient, the shoes are normally resiliently held in fixed spaced relation with respect to the drum 3 in a degree which depends upon the setting of the screw 41. In other words the spring 29 holds the shoe 8 against the anchor pin 7, and tends to hold this shoe away from the adjacent side of the drum 3: but the spring 30 being less resilient, in addition to holding the shoe 9 against the pin 7, overcomes the action of the spring 29 and forces the shoes 9 and 8 toward the side of the drum adjacent the shoe 8. The stop 41 limits this action by engaging the yieldable plunger 37 resiliently held in position by the spring 35 which, being less resilient than the spring 30 is not overcome thereby. This yieldable stop means thereby centers the brake elements with respect to the drum 3; but permits the movement of these elements peripherally of the drum 3, as will be better understood from the following:

This method of support for the brake means allows said brake means to be moved peripherally in its entirety, i. e. all points included in the shoe chain from the extremity of the end 11 to the extremity of the end 10 are movable peripherally, all of which will be better understood from the following description of the operation.

*Operation*

In the following description the shoes 8 and 9 and the connecting means will be collectively termed "brake means".

First the drum 3 will be considered with its rotative direction as indicated by the full line arrow at the top of Fig. 1: this will be taken as rearward rotation of the drum. The arm 28 is moved to the left, in an anticlockwise direction, and with it the arm 24; thereby moving the pin 22 toward the anchor pin 7 and moving the levers 20 and 21 more nearly into alignment to thereby relatively separate the shoes 8 and 9. This tends to move the ends 10 and 11 away from the anchor pin 7; but as soon as the drum is sufficiently engaged by the brake means to overcome the centering action of the spring 35, the drum frictionally pulls the shoe 9 until the spring 35 is compressed. The shoe 9 therefore moves in a clockwise direction pushing the shoe 8 toward the stop 7 until the end 10 is in firm abutting engagement thereagainst. With the parts in this position, the greater the torque of the drum the greater will be the tendency for the brake means to grip the drum: due to the tendency of the brake means to "wrap" or straighten out as a result of the frictional pull of the drum 3. The pin 7 acts as a fulcrum about which the brake means moves or "wraps", thereby causing the torque exerted by the drum against the brake means to be translated into a radial force delivered to the drum by the brake means. This increased breaking force is a direct result of the self energizing action and is increased in proportion to the increase in the torque of the drum; so that with a constant force applied to the actuating arm 28 the effective braking action will be in direct proportion to the torque of the drum—which, will be in direct proportion to the torque energy exerted by the drum.

Due to the double pivotal connection comprising the pins 14 and 15, the segments 8 and 9 are always in a "fully floating" condition; that is, they always readily assume a concentric position with respect to the inner periphery of the member 3, when the brake segments are moved into operative position. This is a great advantage of the double pivotal connection; and is not possible with a single pivotal connection heretofore used, which necessarily restricts the brake segments to an eccentric position with respect to the drum and causes unequal braking, with consequent unequal wearing of the brake lining. Thus it will be seen that each brake segment is adapted to move into braking engagement concentrically with the inner periphery of the brake drum 3, irrespective of the peripheral position of the segment, or the direction of rotation of the drum.

Considering the drum rotating in the reverse, or forward, direction, this self energizing force is substantially equal to the self energizing force resulting from rearward rotation, and the operation is quite similar to that above described except that the end of brake member 9 fulcrums on pin 7, as will be well understood by those skilled in the art.

Having thus described the invention with particularity with reference to the preferred embodiment of the same it will be obvious to those skilled in the art, after understanding the invention, that many changes and modifications may be made without departing from the spirit and scope of the invention, and I aim in the appended claims to cover such changes and modifications as are within the scope of the invention.

What I claim is:

1. In an internal expanding brake, the combination of a rotatable brake drum, a non-rotatable member, an expansible brake shoe comprising a plurality of relatively heavy brake elements flexibly connected, resilient means for positioning said shoe in non-braking position about said non-rotatable member as a pivot, a limit stop acting to limit the action of said resilient positioning means, means for moving one of said brake elements into braking engagement with said drum to force by its peripheral movement the connected brake element into braking contact with said drum, and resilient means for normally holding said first and said second elements out of braking position.

2. In an internal expanding brake, the combination of a rotatable brake drum, a non-rotatable member, an expansible brake shoe comprising a plurality of relatively rigid brake elements, an anchor stop carried by said non-rotatable member on which said brake shoe is adapted to be pivotally positioned in nonbraking position, resilient means for positioning said shoe in non-braking position about said pivot, an adjustable limit stop to limit the action of said resilient positioning means to thereby center said shoe within said drum, means for moving one of said brake elements into braking position to force by its peripheral movement the connected brake element into braking contact, said anchor stop limiting the movement of said connected brake elements at the time when force is applied thereto by said first brake element, and resilient means for normally holding said first element out of braking engagement.

3. In an internal expanding brake, the combination of a rotatable brake drum, a non-rotatable member, an expansible brake shoe comprising a plurality of relatively rigid brake elements, anchor stop means carried by said non-rotatable member on which said brake shoe is adapted to be pivotally positioned in non-braking position, resilient means for positioning said shoe in non-braking position about said pivot means, limit stop means to limit the action of said resilient positioning means to thereby center said shoe within said drum, means for moving one of said brake elements into braking position to force by its peripheral movement the connected brake elements into braking contact, said anchor stop means limiting the movement of said connected brake elements at the time when force is applied thereto by said first brake element, and resilient means for normally holding said brake elements out of braking engagement.

4. In an internal expanding brake, the combination of a rotatable brake drum, a non-rotatable member, an expansible brake shoe having two adjacent ends adapted for movement toward and from each other and comprising a plurality of relatively heavy brake elements flexibly connected one to the other, anchor stop means carried by said non-rotatable member and acting as pivot means about which said brake shoe is centered and also acting to limit the circumferential movement of the brake shoe, resilient means acting to move said shoe about its pivotal support in one direction, an adjustable stop for limiting said resilient action to thereby center said shoe within said drum when said shoe is in its normal non-braking position, resilient means for normally holding the two adjacent ends of said shoe toward each other and out of braking engagement with said drum, and means for separating the two ends of said shoe, whereby one element of said shoe will be moved into braking position to force by its circumferential movement the connecting brake element into braking contact.

5. In an internal expanding brake, the combination of a rotatable brake drum, a non-rotatable member associated with said drum, and provided with a bearing portion, two brake shoes each provided with one end in cooperating abutting engagement with said bearing portion and having their other ends pivotally and adjustably connected together, resilient means for normally holding said brake shoes against said bearing portion and away from said drum, additional resilient means for peripherally centering said brake shoes with respect to said drum about said bearing portion as a pivot, and means for moving one of said brake shoes away from said bearing portion and both of said shoes into engagement with said drum against the action of said resilient means.

6. In an internal expanding brake, the combination of a rotatable brake drum, a non-rotatable member, a brake element with one free end bearing against said non-rotatable member, resilient means adapted to yieldably hold said end against said member, a second brake element with one free end bearing against said non-rotatable member, a second resilient means less resilient than the first adapted to yieldably hold the free end of said second brake element against said member, means for pivotally connecting the other ends of said brake elements together, and a third resilient means less resilient than the second adapted to normally yieldably hold said brake elements in proper position within said drum about said non-rotatable member as a pivot.

7. In an internal expanding brake, the combination of a rotatable brake drum, a non-rotatable member, a brake element with one free end bearing against said non-rotatable member, resilient means adapted to yieldably hold said end against said member, a second brake element with one free end bearing against said non-rotatable member, a second resilient means less resilient than the first adapted to yieldably hold the free end of said second brake element against said member, means for pivotally connecting the other ends of said brake elements together, a third resilient means less resilient than the second adapted to normally yieldably hold said brake elements in proper position within said drum about said non-rotatable member as a pivot, and means to move one of said brake elements away from said pivot and both of said brake elements into braking engagement with said drum.

8. In a brake mechanism, a drum, a self-energizing brake therefor comprising a plurality of shoes connected by an articulated joint which comprises means for adjusting said shoes relative to each other, additional adjustment means for adjusting said shoes relative to said drum, anchoring means for said brake, said shoes and articulated joint being floatingly supported for limited movement circumferentially of said drum in either direction and relative to said anchoring means, and actuating means separate from said anchoring means for moving said shoes into engagement with said drum.

9. In a brake mechanism, a drum, a self-energizing brake therefor comprising a plurality of shoes connected by an articulated joint which comprises means for adjusting said shoes relative to each other, additional adjustment means for adjusting said shoes relative to said drum, anchoring means for said brake, said shoes and articulated joint being floatingly supported for limited movement circumferentially of said drum in either direction and relative to said anchoring means, and a floating device engaging both shoes and separate from said anchoring means for moving said shoes into engagement with said drum.

In testimony whereof I have signed my name to this specification.

GUSTAV W. CARLSON.